US009465471B2

(12) United States Patent
Naito et al.

(10) Patent No.: US 9,465,471 B2
(45) Date of Patent: Oct. 11, 2016

(54) TRANSPARENT ELECTRODE LAYER, TOUCH PANEL AND ELECTRONIC DEVICE

(71) Applicant: Innolux Corporation, Miao-Li County (TW)

(72) Inventors: Shusaku Naito, Miao-Li County (TW); Jian-Cheng Chen, Miao-Li County (TW); Ayumu Mori, Miao-Li County (TW); Keiko Edo, Miao-Li County (TW); Hong-Sheng Hsieh, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 13 days.

(21) Appl. No.: 14/279,438

(22) Filed: May 16, 2014

(65) Prior Publication Data

US 2015/0212630 A1   Jul. 30, 2015

Related U.S. Application Data

(60) Provisional application No. 61/930,990, filed on Jan. 24, 2014.

(51) Int. Cl.
*G06F 3/041* (2006.01)
*G06F 3/044* (2006.01)
*G06F 3/045* (2006.01)

(52) U.S. Cl.
CPC ............. *G06F 3/0412* (2013.01); *G06F 3/044* (2013.01); *G06F 3/045* (2013.01); *G06F 2203/04103* (2013.01)

(58) Field of Classification Search
CPC ................. G06F 3/044; G06F 3/0412; G06F 2203/04112; G02F 1/13338; G02F 1/1343–1/134336
See application file for complete search history.

(56) References Cited

U.S. PATENT DOCUMENTS

| | | | |
|---|---|---|---|
| 2010/0265210 A1* | 10/2010 | Nakanishi | G09G 5/18 345/174 |
| 2010/0328268 A1* | 12/2010 | Teranishi et al. | 345/175 |
| 2012/0169665 A1* | 7/2012 | Misaki | G06F 3/044 345/174 |
| 2012/0319963 A1* | 12/2012 | Lee | G06F 3/044 345/173 |
| 2014/0091708 A1* | 4/2014 | Tokura et al. | 315/73 |
| 2014/0184560 A1* | 7/2014 | Adachi | G06F 3/0412 345/174 |
| 2014/0347076 A1* | 11/2014 | Barton | G06F 3/0488 324/663 |
| 2015/0153874 A1* | 6/2015 | Liu | G06F 3/044 345/174 |

* cited by examiner

*Primary Examiner* — Sanjiv D Patel
(74) *Attorney, Agent, or Firm* — McClure, Qualey & Rodack, LLP

(57) ABSTRACT

A transparent electrode layer includes plural touch units. Each of the touch units includes a sensing part and a wiring part. The sensing part has at least one dummy slit. The wiring part is electrically connected to the sensing part, and includes at least one conductor line and at least one slit. The at least one conductor line and the at least one slit are alternately formed in the wiring part. A density ratio, in a range between 0.5 and 2, is determined by a sensing part density parameter and a wiring part density parameter.

13 Claims, 7 Drawing Sheets

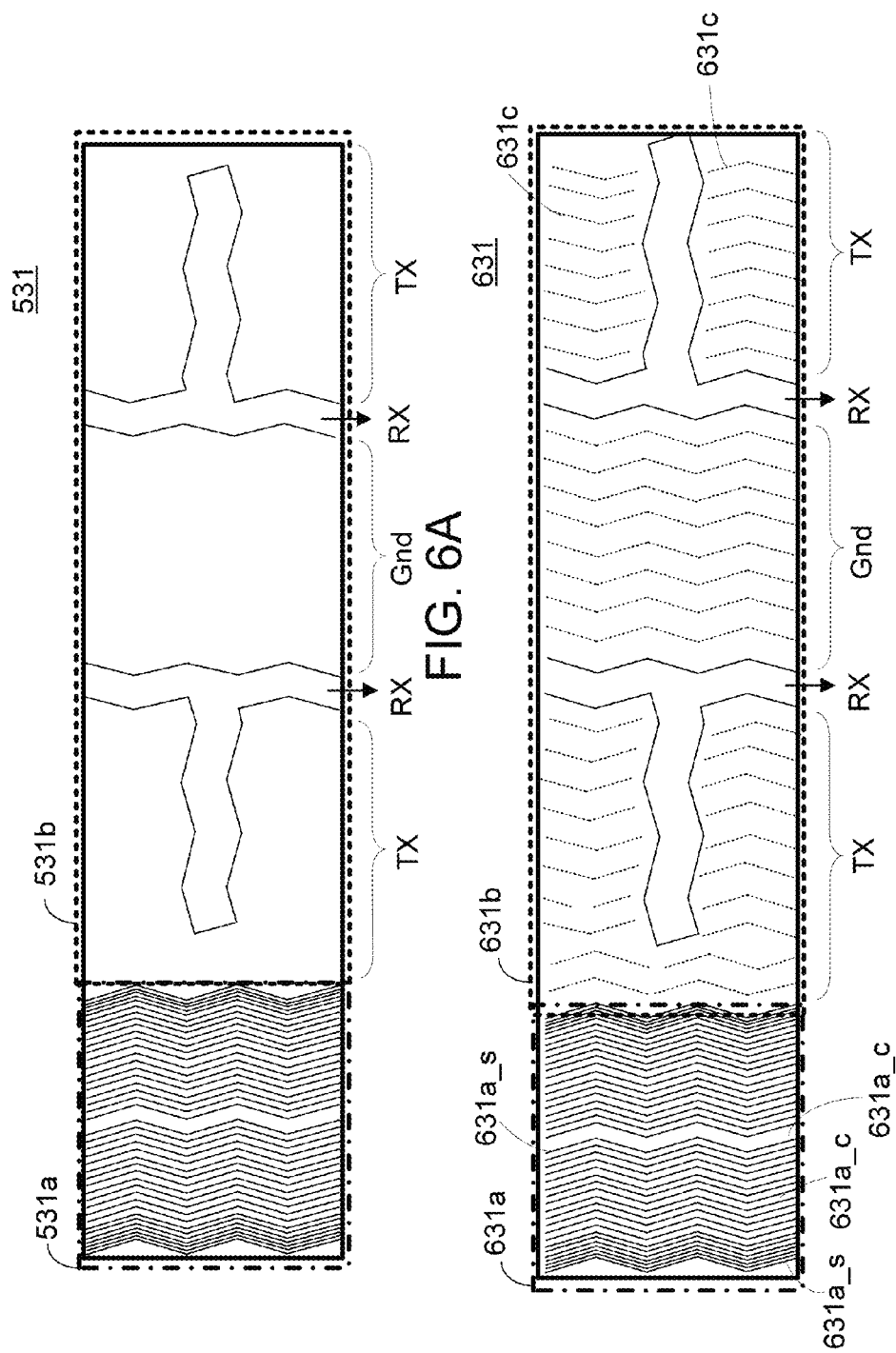

TRANSPARENT ELECTRODE LAYER, TOUCH PANEL AND ELECTRONIC DEVICE

This application claims the benefit of U.S. provisional application Ser. No. 61/930,990, filed Jan. 24, 2014, the subject matter of which is incorporated herein by reference.

FIELD OF THE INVENTION

The present invention relates to a transparent electrode layer, a touch panel and an electronic device, and more particularly to a transparent electrode layer, a touch panel and an electronic device with dummy slits.

BACKGROUND OF THE INVENTION

Generally, a touch panel has both a displaying function and a touch control function. The touch control function may be implemented according to a resistive sensing technology, a capacitive sensing technology or an infrared sensing technology etc.

FIG. 1 is a schematic side view illustrating a conventional touch panel. As shown in FIG. 1, from bottom to top, the touch panel 1 includes a lower polarizer 18, a thin film transistor (hereinafter, TFT) substrate 19, a liquid crystal layer 17, a color film substrate 15, an upper polarizer 13, and a protective glass layer 11. Moreover, plural transparent electrodes 12 are formed in the upper polarizer 13 in order to provide a touch control function.

For achieving the displaying function, the transparent electrode 12 of the touch panel 1 has the transparent property and the electrically-conductive property. Generally, the transparent electrode 12 is made of a transparent conductive oxide (hereinafter, TCO) material.

For realizing the locations of the touch points, the plural transparent electrodes 12 are arranged in the upper polarizer 13. That is, every two adjacent transparent electrodes 12 are separated from each other by a gap. Although the transparent electrodes 12 are light-transmissive, the transmittance of the locations corresponding to the transparent electrodes 12 is lower than the transmittance of the other locations of the touch panel by about 7%. In other words, the arrangement of the transparent electrodes 12 may influence the transmittance of the touch panel.

As shown in FIG. 1, the light beam L1 is directly transmitted through the upper polarizer 13, and the light beam L2 is transmitted through the transparent electrodes 12. Since the transmittance of the locations corresponding to the transparent electrodes 12 is lower, the light beam L1 is visually brighter than the second light beam L2.

FIG. 2 schematically illustrates an image shown on the conventional touch panel. In case that an image is shown on the touch panel, the arrangement of the transparent electrodes 12 may result in non-uniform brightness distribution of the image. In other words, the conventional touch panel has a visibility issue. Therefore, there is a need of providing a transparent electrode layer with improved transmittance while maintaining the touch control function.

SUMMARY OF THE INVENTION

The present invention relates to a transparent electrode layer, a touch panel and an electronic device, and more particularly to a transparent electrode layer, a touch panel and an electronic device with improved transmittance.

An embodiment of the present invention provides a transparent electrode layer. The transparent electrode layer includes plural touch units. Each touch unit includes a sensing part and a wiring part. The sensing part has at least one dummy slit. The wiring part is electrically connected to the sensing part, and includes at least one conductor line and at least one slit. The at least one conductor line and the at least one slit are alternately formed in the wiring part. A density ratio, in a range between 0.5 and 2, is determined by a sensing and a wiring part density parameters.

Another embodiment of the present invention provides a touch panel. The touch panel includes a display layer and a transparent electrode layer. The transparent electrode layer is disposed above the display layer, and includes plural touch units. Each of the touch units includes a sensing part and a wiring part. The sensing part has at least one dummy slit. The wiring part is electrically connected to the sensing part, and includes at least one conductor lines and at least one slits. The at least one conductor lines and the at least one slit are alternately formed in the wiring part. A density ratio, in a range between 0.5 and 2, is determined by a sensing and a wiring part density parameters.

A further embodiment of the present invention provides an electronic device. The electronic device includes a touch panel and a controller. The touch panel includes a display layer and a transparent electrode layer. The transparent electrode layer is disposed above the display layer and includes plural touch units. Each of the touch units includes a sensing part and a wiring part. The sensing part has at least one dummy slit. The wiring part is electrically connected to the sensing part, and includes at least one conductor line and at least one slit. The at least one conductor line and the at least one slit are alternately formed in the wiring part. The controller is electrically connected with the touch panel. A touch control procedure is correspondingly implemented by the controller. A density ratio, in a range between 0.5 and 2, is determined by a sensing and a wiring part density parameters.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 6A is a schematic view illustrating another conventional touch unit;

FIG. 6B is a schematic view illustrating a touch unit of the transparent electrode layer according to another embodiment of the present invention;

DETAILED DESCRIPTION OF PREFERRED EMBODIMENTS

As previously described, the transmittance of the locations corresponding to the transparent electrodes is lower than the transmittance of the other locations of the touch panel. That is, the arrangement of the transparent electrodes may result in non-uniform brightness distribution of the image. For solving the drawbacks, the present invention provides a transparent electrode layer, a touch panel and an electronic device. The touch panel includes a display layer and the transparent electrode layer. The transparent electrode layer is disposed above the display layer. For example, the display layer is a liquid crystal layer, an electro-phoretic display (EPD) layer or a cholesteric liquid crystal display (CLCD) layer. The transparent electrode layer includes plural touch units. Each touch unit includes a wiring part and a sensing part. Moreover, plural dummy slits are formed in the sensing part. Due to the dummy slits, the contrast of the touch panel is reduced. Since the contrast is reduced, the transmittance of the touch panel is improved.

Figure 3:
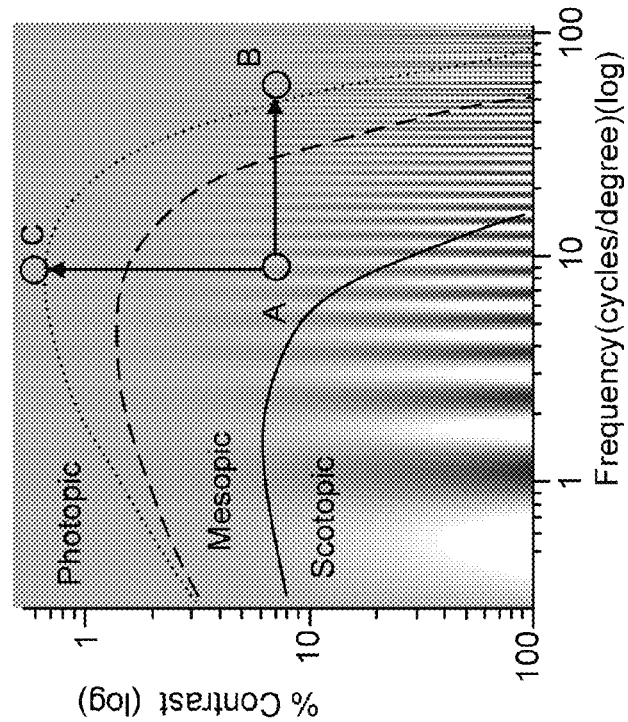
FIG. 3 is a plot illustrating the relationship between the contrast and the spatial frequency.
Figure 1:
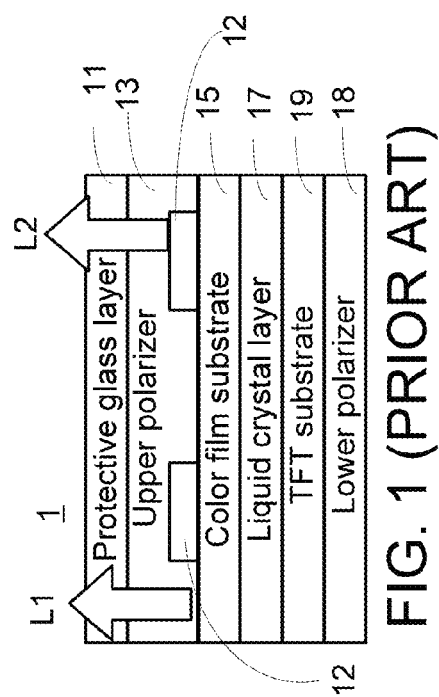
FIG. 1 (prior art) is a schematic side view illustrating a conventional touch panel.
Figure 2:
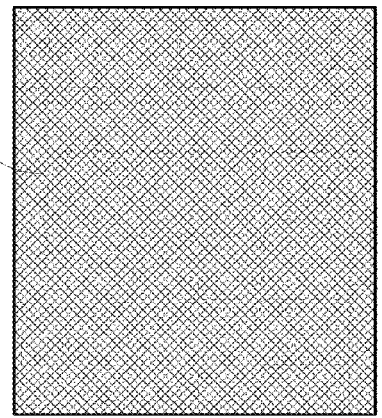
FIG. 2 (prior art) schematically illustrates an image shown on the conventional touch panel.

FIG. 3 is a plot illustrating the relationship between the contrast and the spatial frequency. In FIG. 3, the horizontal axis denotes the contrast, and the vertical axis denotes the spatial frequency. In the vertical axis, the upper coordinate denotes the lower contrast, and the lower coordinate denotes the higher contrast. As shown in FIG. 3, the eye brightness response is dependent on the contrast and the spatial frequency.

In case that the contrast is high, the eye brightness response is high. Whereas, in case that the contrast is low, the eye brightness response is low. Moreover, in case that the spatial frequency is low, the eye brightness response is high. Whereas, in case that spatial frequency is high, the eye brightness response is low.

In other words, in case that the contrast is high and the spatial frequency is low, the eye brightness response is high. For example, if the spatial frequency is increased, the eye brightness response may be shifted rightward from the point A to the point B. On the other hand, if the contrast is reduced, the eye brightness response may be shifted upward from the point A to the point C.

In accordance with the present invention, plural dummy slits are formed in the transparent electrode layer. Due to the dummy slits, the contrast of the touch panel is reduced. Since the contrast is reduced, the visual effect of the touch panel is improved.

Figure 4:
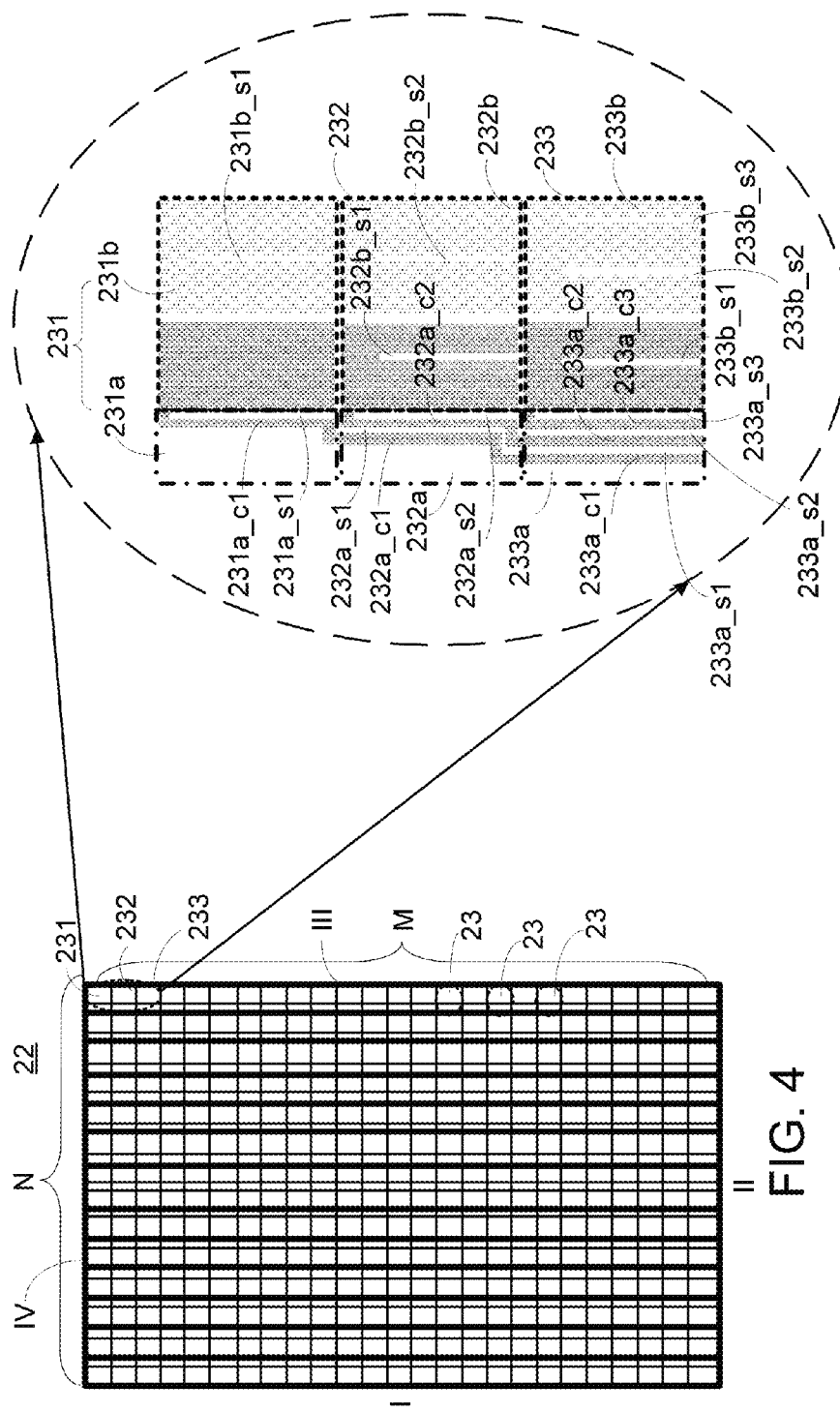
FIG. 4 schematically illustrates a transparent electrode layer according to an embodiment of the present invention.

FIG. 4 schematically illustrates a transparent electrode layer according to an embodiment of the present invention. As shown in FIG. 4, the transparent electrode layer 22 is applied to a touch panel.

Generally, the transparent electrode layer 22 has a rectangular shape with four edges I, II, III and IV. The first edge I and the third edge III of the transparent electrode layer 22 are in parallel with each other. The second edge II and the fourth edge IV are in parallel with each other. Moreover, the first edge I and the second edge II are perpendicular to each other. For recognizing the location of the touch points, the transparent electrode layer 22 includes an array of touch units 23. When one touch point 23 is generated, a corresponding touch signal is generated by the transparent electrode layer 22. According to the touch signal, the corresponding coordinate value of the touch point is realized. For example, in case that the touch units 23 of the transparent electrode layer 22 are arranged in an array with M rows and N columns, the transparent electrode layer 22 may provide M×N coordinate values.

For facilitating understanding the transparent electrode layer 22, the enlarged view of three touch units 23 at an upper right corner of the transparent electrode layer 22 is shown in the right side of FIG. 4. These three touch units 23 include a first touch unit 231, a second touch unit 232 and a third touch unit 233. Each of the touch units 23 includes a wiring part and a sensing part. The first touch unit 231 includes a first wiring part 231a and a first sensing part 231b. The second touch unit 232 includes a second wiring part 232a and a second sensing part 232b. The third touch unit 233 includes a third wiring part 233a and a third sensing part 233b.

When the location of the touch point is sensed through the sensing part, a corresponding electrical property change is generated. A touch signal corresponding to the electrical property change is transmitted to a controller through the wiring part. According to the touch signal, a touch control procedure is implemented by the controller.

For each touch unit, the sensing part is wider than the wiring part. Consequently, for each touch unit, the area of the sensing part is larger than the area of wiring part. For example, the area of the first sensing part 231b of the first touch unit 231 is larger than the area of the first wiring part 231a of the first touch unit 231. The rest may be deduced by analogy.

The conductor lines of the wiring part are extended from a location near the fourth edge IV to the second edge II along the direction parallel with the first edge I. That is, the conductor lines of the wiring part are all in parallel with the first edge I and connected to the second edge II. Moreover, plural slits (also referred as wiring part slits) are formed between the adjacent conductor lines and between the sensing parts and the adjacent conductor lines.

As shown in FIG. 4, the wiring part of the first touch unit 231 includes a conductor line 231a_c1. In addition, a wiring part slit 231a_s1 is formed between the conductor line 231a_c1 and the first sensing part 231b.

The wiring part of the second touch unit 232 includes two conductor lines 232a_c1 and 232a_c2. A wiring part slit 232a_s1 is formed between the two conductor lines 232a_c1 and 232a_c2. Another wiring part slit 232a_s2 is formed between the conductor line 232a_c2 and the second sensing part 232b.

The wiring part of the third touch unit 233 includes three conductor lines 233a_c1, 233a_c2 and 233a_c3. A wiring part slit 233a_s1 is formed between the two conductor lines 233a_c1 and 233a_c2. Another wiring part slit 233a_s2 is formed between the two conductor lines 233a_c2 and 233a_c3. Another wiring part slit 233a_c is formed between the conductor line 233a_c3 and the third sensing part 233b.

In each column of M touch units, the wiring part of the touch unit closest to the fourth edge IV has one conductor line and one wiring part slit; and the wiring part of the touch unit closest to the second edge II has M conductor lines and M wiring part slits. That is, in each column of M touch units, the wiring part of the touch unit closest to the fourth edge IV has less conductor lines; and the wiring part of the touch unit closest to the second edge II has more conductor lines.

In accordance with the present invention, dummy slits are formed in the first sensing part 231b, the second sensing part 232b and the third sensing part 233b of the touch units 23. The numbers of the dummy slits in different sensing parts are different. In an embodiment, the first sensing part 231b of the first touch unit 231 has one dummy slit 231b_s1, the second sensing part 232b of the second touch unit 232 has two dummy slits 232b_s1 and 232b_s2, and the third sensing part 233b of the third touch unit 233 has three dummy slits 233b_s1, 233b_s2 and 233b_s3.

In this embodiment, the number of the dummy slits of the sensing part is determined according to the number of the conductor lines of the corresponding wiring part. As shown in FIG. 4, the first wiring part 231a has one wiring part slit, and the first sensing part 231b has one dummy slit. In addition, the second wiring part 232a has two wiring part slits, and the second sensing part 232b has two dummy slits. In addition, the third wiring part 233a has three wiring part slits, and the third sensing part 233b has three dummy slits.

As mentioned above, the number of the dummy slits of the sensing part is determined according to the number of the conductor lines of the corresponding wiring part. Since the numbers of the wiring part slits (also referred as a slit number of the wiring part) in different wiring parts are different, the numbers of the dummy slits (also referred as a number of the dummy slits) in different sensing parts are different.

Since plural dummy slits are formed in the sensing part, the transmittance of the transparent electrode layer is correspondingly changed. That is, the arrangement of the dummy slits may adjust the visual effect of the display panel. It is noted that the number, dimension and area of the dummy slits may be adjusted according to the practical requirements.

Figure 5A:
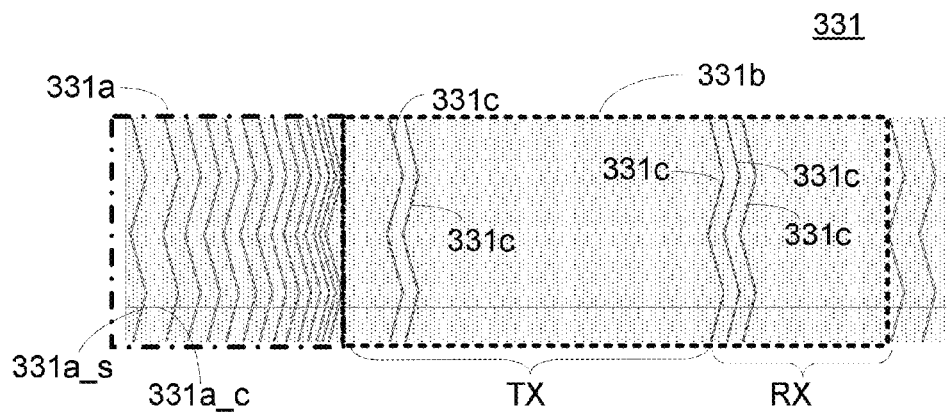
FIG. 5A is a schematic view illustrating a conventional touch unit.

FIG. 5A is a schematic view illustrating a conventional touch unit. The conventional touch unit 331 includes a wiring part 331a and a sensing part 331b. For example, the wiring part 331a includes thirteen conductor lines 331a_c and thirteen wiring part slits 331a_s. Moreover, the sensing part 331b includes five original slits 331c.

The sensing part 331b includes a transmitting region TX and a receiving region RX. In case that the user's finger touch the surface of the touch panel to generate a touch point, an electrical property between the transmitting region TX and the receiving region RX is subjected to a change. For example, the electrical property change is a capacitance change, a resistance change or a voltage change.

Figure 5B:
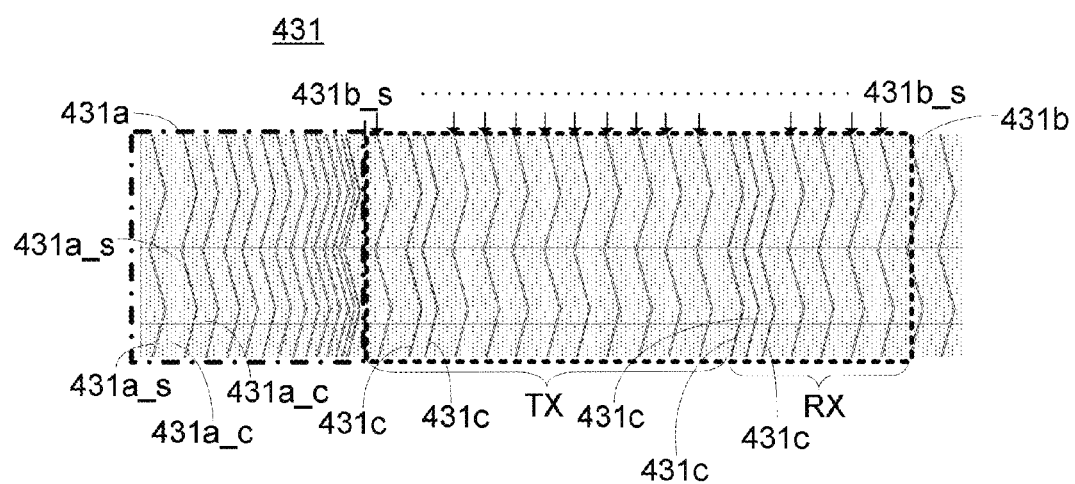
FIG. 5B is a schematic view illustrating a touch unit of the transparent electrode layer according to the embodiment of the present invention.

FIG. 5B is a schematic view illustrating a touch unit of the transparent electrode layer according to the embodiment of the present invention. As shown in FIG. 5B, the touch unit 431 includes a wiring part 431a and a sensing part 431b. For example, the wiring part 431a includes thirteen conductor lines 431a_c and thirteen wiring part slits 431a_s. Moreover, the sensing part 431b includes five original slits 431c and plural dummy slits 431b_s. The dummy slits 431b_s are separate hollow structures.

The dummy slits 431b_s are used for improving the transmittance of the touch panel. As shown in FIG. 5B, these dummy slits 431b_s are uniformly distributed over the transmitting region TX and the receiving region RX of the sensing part 431b.

Moreover, the width of each of the conductor lines 431a_c is determined according to the distance between a start point of the conductor lines and the second edge II. For example, as shown in FIG. 6, the start point of the leftmost conductor line 431a_c is the farthest from the second edge II (or the closest to the fourth edge IV); and the start point of the rightmost conductor line 431a_c is the closest to the second edge II (or the farthest from the fourth edge IV). In other words, the widths of these conductor lines 431a_c are gradually decreased from left to right. Since the widths of these conductor lines 431a_c are gradually decreased from left to right, the time periods of transmitting the electrical property change to the controller through different conductor lines are substantially identical.

In this embodiment, the plural conductor lines 431a_c are not only in parallel with each other, but these conductor lines 431a_c are also wavy. Moreover, the wiring part slits 431a_s, the original slits 431c and the dummy slits 431b_s are in parallel with each other. In particular, the wiring part slits 431a_s, the original slits 431c and the dummy slits 431b_s are wavy. Due to the wavy profiles, the possibility of generating the moire pattern will be minimized. The principle of using the wavy profile to reduce the moire pattern is well known to those skilled in the art, and is not redundantly described herein.

FIG. 6A is a schematic view illustrating another conventional touch unit. The conventional touch unit 531 includes a wiring part 531a and a sensing part 531b. The sensing part 531b includes a ground region Gnd, two transmitting regions TX and two receiving regions RX.

FIG. 6B is a schematic view illustrating a touch unit of the transparent electrode layer according to another embodiment of the present invention. In this embodiment, the touch unit 631 includes a wiring part 631a and a sensing part 631b. Dummy slits 631c, as shown by wavy dotted lines, are uniformly distributed over the ground region Gnd, the transmitting regions TX and the receiving regions RX of the sensing part 631b. The conductor lines 631a_c and the wiring part slits 631a_s are alternately formed on the wiring part 631a.

Widths of the conductor lines in FIGS. 5A and 5B are shown in an ascending order. On the other hand, widths of the conductor lines shown in FIGS. 6A and 6B are symmetric and generally even.

In accordance with the present invention, a sensing part density parameter D_tp is defined according to a sensing part area Ab, a number of the dummy slits Nb_s and a number of the original slits Nc. For example, the sensing part density parameter D_tp is defined as a ratio of the summation of the number of the dummy slits Nb_s and the number of the original slits Nc to the sensing part area Ab, i.e. D_tp=(Nb_s+Nc)/Ab.

Similarly, a wiring part density parameter D_con is defined according to a wiring part area Aa and a slit number of the wiring part Na_s. For example, the wiring part density parameter D_con is defined as a ratio of the slit number of the wiring part Na_s to the wiring part area Aa, i.e. D_con=Na_s/Aa.

Furthermore, a density ratio R is defined according to the sensing part density parameter D_tp and the wiring part density parameter D_con. For example, the density ratio R is a ratio of the sensing part density parameter D_tp to the wiring part density parameter D_con, i.e. R=D_tp/D_con. As mentioned above, the wiring part area Aa, the slit number of the wiring part Na_s, the number of the original slits Nc and the sensing part area Ab are known values. Consequently, as the number of the dummy slits Nb_s is changed, the density ratio R is correspondingly adjusted. On the other hand, if the desired density ratio R is set, the required number of the dummy slits Nb_s may be calculated.

Figures 7A, 7B:
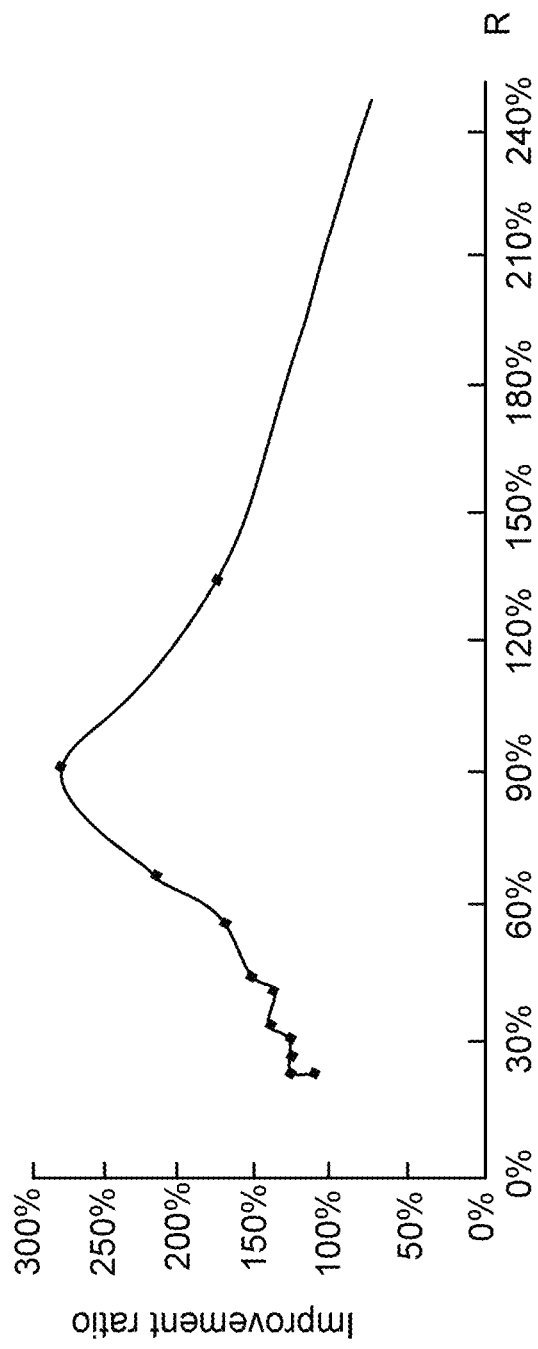
FIG. 7A is a table illustrating the relationship between the density ratio and the transmittance improvement ratio for the transparent electrode layer according to the embodiment of the present invention.
FIG. 7B is a plot illustrating the relationship between the density ratio and the transmittance improvement ratio for the transparent electrode layer according to the embodiment of the present invention.

FIG. 7A is a table illustrating the relationship between the density ratio and the transmittance improvement ratio for the transparent electrode layer according to the embodiment of the present invention. In case that the density ratio R is 200% or 20%, the transmittance improvement ratio is slightly better. In case that the density ratio R is 45% or 170%, the transmittance improvement ratio is better. In case that the density ratio R is 60%, 100% or 130%, the transmittance improvement ratio is excellent.

FIG. 7B is a plot illustrating the relationship between the density ratio and the transmittance improvement ratio for the transparent electrode layer according to the embodiment of the present invention. As shown in FIG. 7B, the transmittance of the touch panel is excellent when the density ratio R is approximately 100%. In case that the density ratio R is in the range between 60% and 140%, the transmittance improvement ratio is increased by about 50%. In case that the density ratio R is approximately 100%, the transmittance improvement ratio is increased by about 150%. That is, if the sensing part density parameter D_tp is close to the wiring part density parameter D_con, the transparent electrode layer has excellent transmittance.

For example, in an embodiment, the width of each original slit, the width of each dummy slit and the width of each wiring part slit are assumed to be identical. If the sum of the number of original slit and the number of dummy slit (Nc+Nb_s) is equal to the slit number of wiring part (Na_s), the transparent electrode layer has the best transmittance. Alternatively, in some other embodiments, the number of original slit is zero and the width of each dummy slit is twice the width of each wiring part slit. Under this circumstance, if the number of the dummy slits (Nb_s) is a half of slit number of the wiring part (Na_s), the transparent electrode layer has the best transmittance.

From the above discussions about the density ratio R, the transmittance of the touch panel of the present invention is improved. As the number of dummy slit of the sensing part is increased, the touch sensing efficacy may be deteriorated. Consequently, the number of dummy slit of the sensing part is determined according to the practical requirements. Preferably, the density ratio R is in the range between 0.5 and 2. More preferably, the density ratio R is in the range between 0.7 and 1.2.

For example, for improving the transmittance of the transparent electrode layer of FIG. 5, the density ratio R may be in the range between 0.5 and 2. As shown in FIG. 5, the width of the wiring part of the touch unit is 1.3 mm, the slit number of wiring part is 14, and the width of the sensing part of the touch unit is 3.0 mm.

Since the wiring part and a sensing part have the same length, only the width of the wiring part and the width of the sensing part are taken into consideration. Moreover, the sensing part 331b includes five original slits 331c. That is, the number of original slit N_c of the original slits 331c is 5 (i.e. N_c=5), which is also taken into consideration.

Consequently, the possible value of the number of dummy slit Nb_s may be calculated according to the following mathematical relationship:

$$R\min \times (Na\_s/Aa) < (N\_c + Nb\_s)/Ab < R\max \times (Na\_s/Aa)$$
$$\Rightarrow 0.5 \times (14/1.3) < (5 + Nb\_s)/3 < 2 \times (14/1.3)$$
$$\Rightarrow 16.2 < (5 + Nb\_s) < 64.6$$
$$\Rightarrow 11.2 < Nb\_s < 59.6$$

That is, the number of dummy slit Nb_s is in the range between the 12 and 59.

In the above embodiments, the widths of all slits (including the dummy slits and the wiring part slits) are identical. Consequently, the sensing part density parameter D_tp and the wiring part density parameter D_con are defined according to the number of slits. However, in practical applications, the widths of all slits are not always identical. For example, the width of the dummy slit of the sensing part is different from the width of the wiring part slit. Alternatively, in some other embodiments, the widths of the plural dummy slits of the sensing part may be different from each other, and the widths of the plural wiring part slits may be different from each other.

In case that the widths of all slits are not completely identical, the widths of the slits should be taken into consideration while calculating the sensing part density parameter D_tp and the wiring part density parameter D_con. Moreover, the sensing part density parameter D_tp is also determined according to the total area of the dummy slits and the original slits, and the wiring part density parameter D_con is also determined according to the total area of the wiring part slits.

Figure 8:
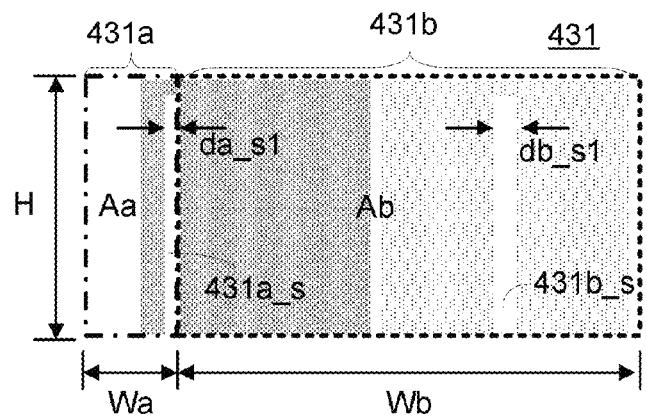
FIG. 8 is a schematic view illustrating a touch unit of the transparent electrode layer according to another embodiment of the present invention, in which the widths of the slits are different.

FIG. 8 is a schematic view illustrating a touch unit of the transparent electrode layer according to another embodiment of the present invention, in which the widths of the slits are different.

For example, the wiring part density parameter D_con is defined as a ratio of the total area of the wiring part slits $$\left( \sum_{i=1}^{Na\_s} da\_si * H \right)$$

to the wiring part area Aa. In the above formula about the total area of the wiring part slits, da_si denotes the width of each wiring part slit, Na_s denotes the slit number of wiring part, and H denotes the length of the slit. Since the length of the slit is substantially equal to the length of the wiring part, the wiring part area Aa=Wa×H, wherein Wa is the width of the wiring part. Consequently, the wiring part density parameter D_con may be expressed by the following formula:

$$D\_con = \frac{\sum_{i=1}^{Na\_s} da\_si * H}{Wa * H} = \frac{\sum_{i=1}^{Na\_s} da\_si}{Wa}.$$

For simply describing the definition of the sensing part density parameter D_tp, it is assumed that the number of original slit N_c is zero. That is, the sensing part density parameter D_tp is defined as a ratio of the total area of the dummy slits $$\left(\sum_{i=1}^{Nb\_s} db\_sj * H\right)$$

to the sensing part area Ab, wherein db_sj denotes the width of each dummy slit, Nb_s denotes the number of dummy slit, and H denotes the length of the slit. Since the length of the slit is substantially equal to the length of the sensing part, the sensing part area Ab is defined as Ab=Wb×H, wherein Wb is the width of the sensing part. Consequently, the sensing part density parameter D_tp may be expressed by the following formula:

$$D\_tp = \frac{\sum_{j=1}^{Nb\_s} db\_sj * H}{Wb * H} = \frac{\sum_{i=1}^{Nb\_s} db\_sj}{Wb}.$$

For clarification and brevity, only one wiring part slit 431a_s and one dummy slit 431b_s are shown in the drawing. It is noted that the slit number of the wiring part 431a_s and the number of dummy slits 431b_s may be varied according to the practical requirements. Moreover, the number and the area of the original slits have to be taken into consideration.

Figure 9:
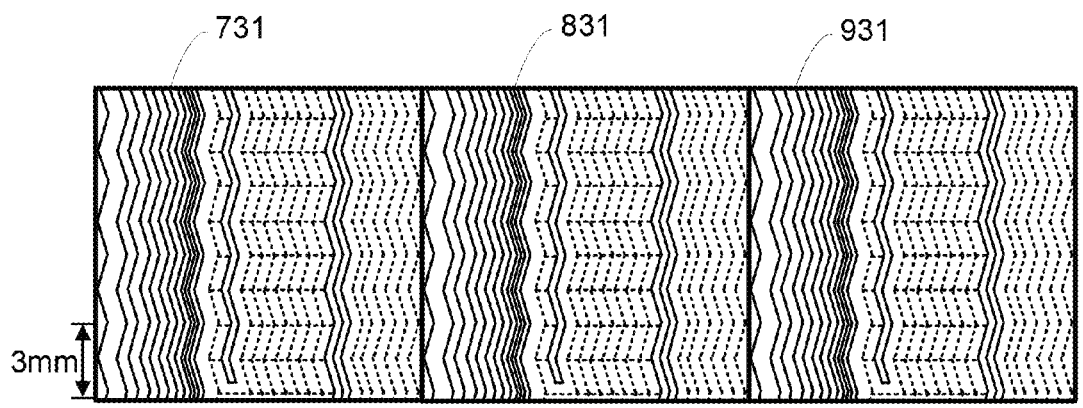
FIG. 9 schematically illustrates three touch units with dummy units according to the present invention.

FIG. 9 schematically illustrates three touch units with dummy units according to the present invention. According to concept of the present invention, the touch units of the transparent electrode layer may be repeatedly arranged. Layout of the conductor lines, the wiring part slits, and the dummy slits of the touch units 731, 831, 931 are assumed to be repeated every 3 millimeters.

Each of the three touch units 731, 831, 931 is corresponding to a density ratio. Thus, a density ratio of the touch unit 731 is determined by a sensing part density parameter of the touch unit 731 divided by a wiring part density parameter of the touch unit 731. Density ratios of the touch units 831, 931 may be conducted similarly.

Values of the density ratios of the touch units 731, 831, 931 are not necessary to be equivalent. As long as any density ratio of the touch units on the transparent electrode layer is in a range between 0.5 and 2, the transmittance of the transparent electrode layer can be increased and the visual effect of the touch panel can be improved.

Figure 10:
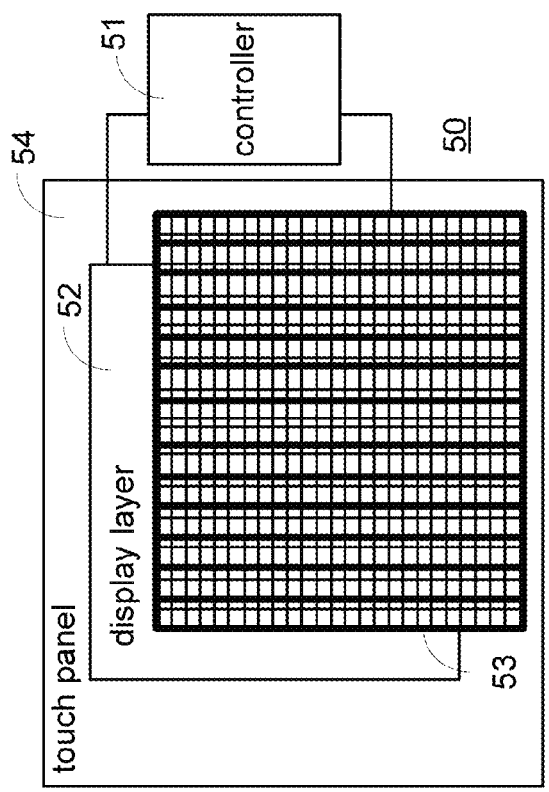
FIG. 10 schematically illustrates an electronic device with a touch function according to an embodiment of the present invention.

FIG. 10 schematically illustrates an electronic device with a touch function according to an embodiment of the present invention. The electronic device 50 includes a controller 51 and a touch panel 54 including a display layer 52, and a transparent electrode layer 53. The controller 51 is electrically connected with the display layer 52 and the transparent electrode layer 53. Moreover, the display layer 52 and the transparent electrode layer 53 are overlapped with each other. After the touch signal generated from the transparent electrode layer 53 is received by the controller 51, the display layer 52 and/or other components are controlled by the controller 51 and a touch control procedure is correspondingly implemented.

Figure 11:
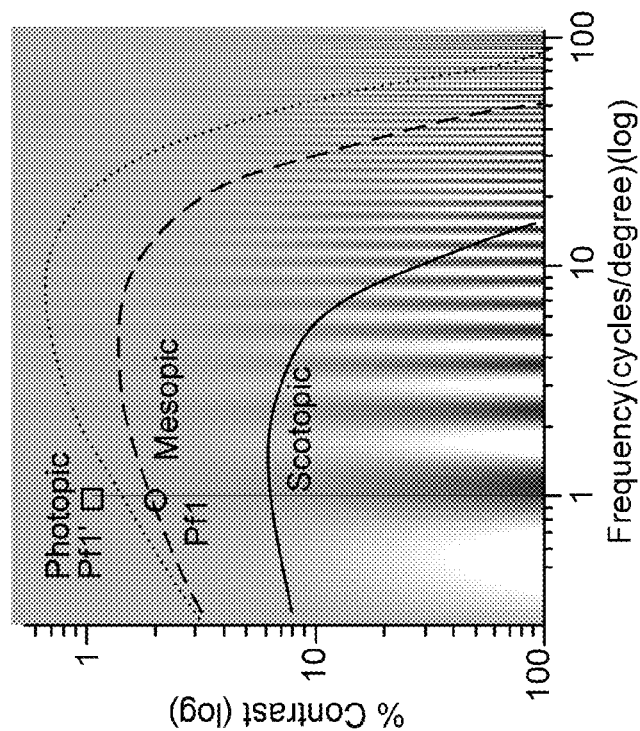
FIG. 11 is a plot illustrating the relationship between the contrast and the spatial frequency for the conventional technology and the present technology.

FIG. 11 is a plot illustrating the relationship between the contrast and the spatial frequency for the conventional technology and the present technology. As shown in FIG. 11, the circular symbol denotes the result of the conventional technology, and the rectangular symbol denotes the result of the present technology.

In case that the spatial frequency is a fundamental frequency, the contrast for the conventional technology and the contrast for the present technology are distinguished. As shown in FIG. 11, the contrast for the conventional technology is higher. On the other hand, the contrast for the touch panel with the transparent electrode layer of the present invention is reduced. That is, the eye brightness response is shifted from the mesopic range (e.g. the point Pf1) to the photopic range (e.g. the point Pf1'). Consequently, the visual effect of the touch panel is improved.

In the above embodiment, the transparent electrode layer is made of indium tin oxide (hereinafter, ITO). It is noted that the material of the transparent electrode layer is not restricted. For example, in some other embodiments, the transparent electrode layer may be made of indium zinc oxide (hereinafter, IZO) or any other appropriate electrically-conductive material.

From the above descriptions, the present invention provides a transparent electrode layer with plural touch units. Each of the touch units includes a wiring part and a sensing part. Shape of the transparent electrode layer is not limited. For instance, the transparent electrode layer may have a parallelogram shape or a polygon shape. Regardless the shape of the electrode layer, plural conductor lines of the plural touch units are extended in parallel with an edge of the transparent electrode layer. Since plural dummy slits are formed in the sensing part, the transmittance of the transparent electrode layer is increased and the visual effect of the touch panel is improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A transparent electrode layer comprising plural touch units, each touch unit comprising:
    a sensing part with at least one dummy slit; and
    a wiring part, electrically connected to the sensing part, and comprising at least one conductor line and at least one wiring part slit, wherein the at least one conductor line and the at least one wiring part slit are alternately formed in the wiring part, and a density ratio, as determined by a sensing part density parameter divided by a wiring part density parameter, is in a range between 0.5 and 2;
    wherein the wiring part density parameter is defined as a ratio of a total area of the at least one wiring part slit to an area of the wiring part, and the sensing part density parameter is defined as a ratio of a total area of the at least one dummy slit to an area of the sensing part;
    wherein a number, a dimension or an area of the at least one dummy slit of different sensing part of the plural touch units are different;
    wherein when a number of the at least one conductor line of the wiring part of a first touch unit is greater than the number of the at least one conductor line of the wiring part of a second touch unit, the number of the at least one dummy slit of the sensing part of the first touch unit is greater than the number of the at least one dummy slit of the sensing part of the second touch unit.

2. The transparent electrode layer as claimed in claim 1, wherein transmittance of the sensing part is close to transmittance of the wiring part.

3. The transparent electrode layer as claimed in claim 1, wherein the sensing part comprises a transmitting region and a receiving region, wherein a capacitance change, a resistance change or a voltage change is between the transmitting region and the receiving region and corresponding to a touch point.

4. The transparent electrode layer as claimed in claim 1, wherein the transparent electrode layer has a parallelogram shape or a polygon shape, wherein the at least one conductor line is extended in parallel with an edge of the parallelogram shape or the polygon shape.

5. The transparent electrode layer as claimed in claim 1, wherein the transparent electrode layer has a rectangular shape with a first edge, a second edge, a third edge and a fourth edge, wherein the first edge and the third edge are in parallel with each other, the second edge and the fourth edge are in parallel with each other, and the first edge and the second edge are perpendicular to each other, wherein the at least one conductor line is extended from a location near the fourth edge to the second edge along a direction parallel with the first edge.

6. The transparent electrode layer as claimed in claim 5, wherein the plural touch units are arranged in an array with M rows and N columns.

7. The transparent electrode layer as claimed in claim 6, wherein in each column of M touch units, a slit number of the wiring part of a touch unit closer to the second edge is larger than that of a touch unit closer to the fourth edge.

8. The transparent electrode layer as claimed in claim 7, wherein in each column of M touch units, a number of the dummy slit of the touch unit closer to the second edge is larger than that of the touch unit closer to the fourth edge.

9. A transparent electrode layer comprising plural touch units, each touch unit comprising:
a sensing part with at least one dummy slit; and
a wiring part, electrically connected to the sensing part, and comprising at least one conductor line and at least one wiring part slit, wherein the at least one conductor line and the at least one wiring part slit are alternately formed in the wiring part, and a density ratio, as determined by a sensing part density parameter divided by a wiring part density parameter, is in a range between 0.5 and 2;
wherein the transparent electrode layer has a rectangular shape with a first edge, a second edge, a third edge and a fourth edge, wherein the first edge and the third edge are in parallel with each other, the second edge and the fourth edge are in parallel with each other, and the first edge and the second edge are perpendicular to each other, wherein the at least one conductor line is extended from a location near the fourth edge to the second edge along a direction parallel with the first edge;
wherein the plural touch units are arranged in an array with M rows and N columns;
wherein in each column of M touch units, the touch unit closest to the second edge has M conductor lines and M slits of the wiring part, and the touch unit closest to the fourth edge has one conductor line and one slit of the wiring part;
wherein when a number of the at least one conductor line of the wiring part of a first touch unit is greater than the number of the at least one conductor line of the wiring part of a second touch unit, the number of the at least one dummy slit of the sensing part of the first touch unit is greater than the number of the at least one dummy slit of the sensing part of the second touch unit.

10. The transparent electrode layer as claimed in claim 1, wherein an area of the sensing part of each touch unit is larger than an area of the corresponding wiring part.

11. The transparent electrode layer as claimed in claim 1, wherein the conductor lines are in parallel with each other, and the conductor lines are wavy.

12. A touch panel, comprising:
a display layer; and
a transparent electrode layer disposed above the display layer, and comprising plural touch units, wherein each of the touch units comprises:
a sensing part with at least one dummy slit; and
a wiring part, electrically connected to the sensing part, and comprising at least one conductor line and at least one wiring part slit, wherein the at least one conductor line and the at least one wiring part slit are alternately formed in the wiring part, and a density ratio, as determined by a sensing part density parameter divided by a wiring part density parameter, is in a range between 0.5 and 2;
wherein the wiring part density parameter is defined as a ratio of a total area of the at least one wiring part slit to an area of the wiring part, and the sensing part density parameter is defined as a ratio of a total area of the at least one dummy slit to an area of the sensing part;
wherein a number, a dimension or an area of the at least one dummy slit of different sensing part of the plural touch units are different;
wherein when a number of the at least one conductor line of the wiring part of a first touch unit is greater than the number of the at least one conductor line of the wiring part of a second touch unit, the number of the at least one dummy slit of the sensing part of the first touch unit is greater than the number of the at least one dummy slit of the sensing part of the second touch unit.

13. An electronic device, comprising:
a touch panel comprising a display layer and a transparent electrode layer, wherein the transparent electrode layer is disposed above the display layer and comprises plural touch units, wherein each of the touch units comprises:
a sensing part with at least one dummy slit; and
a wiring part electrically connected to the sensing part, and comprising at least one conductor line and at least one wiring part slit, wherein the at least one conductor line and the at least one wiring part slit are alternately formed in the wiring part, and a density ratio, as determined by a sensing part density parameter divided by a wiring part density parameter, is in a range between 0.5 and 2; and
a controller, electrically connected with the touch panel, wherein a touch control procedure is correspondingly implemented by the controller;
wherein the wiring part density parameter is defined as a ratio of a total area of the at least one wiring part slit to an area of the wiring part, and the sensing part density parameter is defined as a ratio of a total area of the at least one dummy slit to an area of the sensing part;

wherein a number, a dimension or an area of the at least one dummy slit of different sensing part of the plural touch units are different;
wherein when a number of the at least one conductor line of the wiring part of a first touch unit is greater than the number of the at least one conductor line of the wiring part of a second touch unit, the number of the at least one dummy slit of the sensing part of the first touch unit is greater than the number of the at least one dummy slit of the sensing part of the second touch unit.

* * * * *